April 22, 1958     N. W. KIRCHER     2,831,708
FLANGE UNIT FOR LATERALLY INSERTABLE PIPE SECTION
Filed July 21, 1954
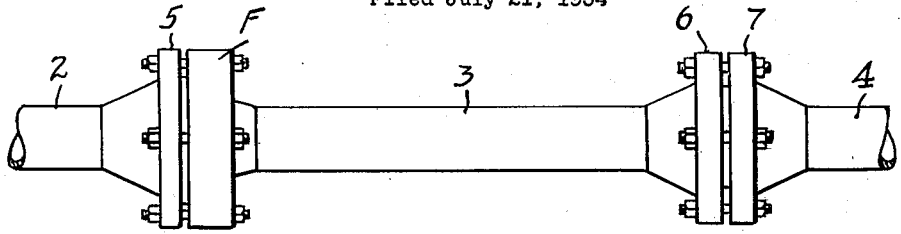
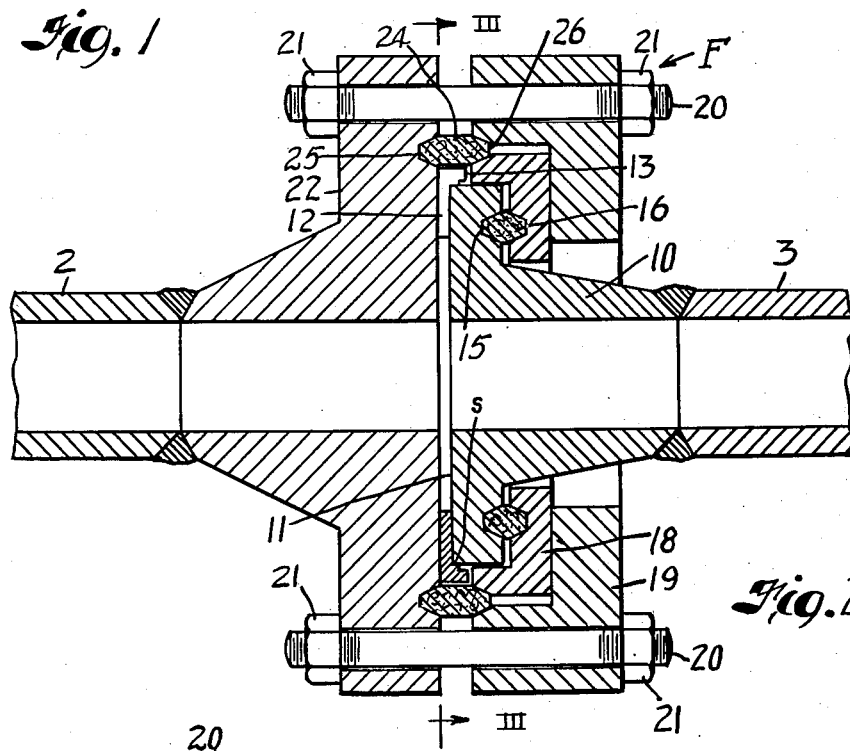
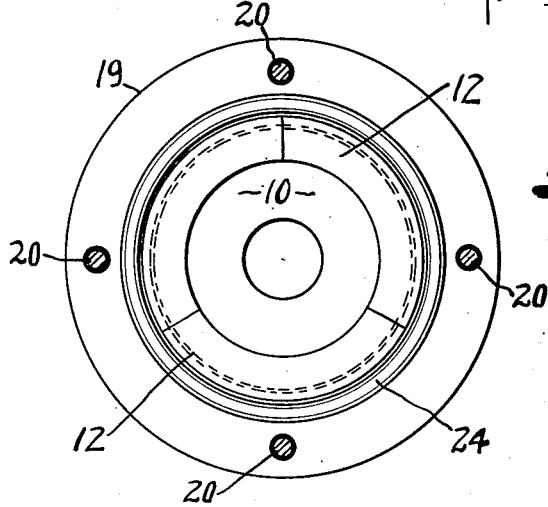
INVENTOR.
NEVIN W. KIRCHER
BY
Oberlin & Limbach
ATTORNEYS.

United States Patent Office 2,831,708
Patented Apr. 22, 1958

2,831,708

FLANGE UNIT FOR LATERALLY INSERTABLE PIPE SECTION

Nevin W. Kircher, Covington, Ky., assignor to The Standard Oil Company, Cleveland, Ohio, a corporation of Ohio Application July 21, 1954, Serial No. 444,681

5 Claims. (Cl. 285—31)

In piping where sections involve end flanges, if the pipe is of small diameter and not too rigidly anchored, the flanges can be separated sufficiently to clear the gasket packing rings, and sections may be taken out or changed. But in cases where the piping is large and heavy and rigidly anchored, such manipulations have been impossible, and piping once installed had to be left as such permanently. In the event that some changes were necessary later, there was involved a tear-down of all the line, and then a re-construction. It has been much desired that there be a possibility of making changes in such large rigid lines. By the present invention, it now becomes possible to provide piping lines of large diameter and rigid anchorage which can yet be changed by taking out sections, and replacing in various form desired. And, withal, the construction does not add undue complication or cost.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawings:

Fig. 1 is a side elevational view of construction which includes a flange in accordance with the present invention;

Fig. 2 is an axial sectional view of the left hand portion of the construction of Fig. 1, on enlarged scale; and Fig. 3 is a smaller scale end elevational view of the improved flange construction, looking in the direction of the arrow III, Fig. 2.

In general, the construction involves a special compound flange joinable to ordinary flanges in a pipe line, and this flange is such that it can be readily dis-assembled in situ after having been set up in the assembled line, such dis-assembly being possible even though the line be rigidly anchored.

In the form as illustrated, there is shown a pipe line of sections 2, 3, 4, Fig. 1, and in this the flanges 5, 6 and 7 are of conventional or usual form while the flange F is in accordance with the present invention. The section 3 is illustrative of any piping section, valve, or spool; or in other words any section which it may be desired to change or replace. As shown in Fig. 2, the flange F involves an assembly of a pipe-end flange 10 welded or otherwise suitably secured to the pipe section 3, and having its end face providing a plane annular surface 11, against which may seat a spacing or filling ring. Advantageously this may take the form of a radial-sectional ring 12; this, as shown in Fig. 3, comprising a plurality of pieces, here three, and having on its periphery some form of means facilitating withdrawal. For instance this may be a ledge 13 which provides a space in which, when the ring is suitably exposed, an implement may be inserted under the ledge for withdrawal or prying out of the ring sections. The spacing of the ledge 13 away from the periphery of the flange 10 that is sufficient for this purpose is provided by reason of a shoulder formed as illustrated under the protruding ledge to seat against the said flange periphery. The flange 10 has a groove 15 on its rear face to receive a packing ring 16, this seating also in an opposed groove in a flange-auxiliary ring 18 which is of general L-shape section, such as to seat against the back face of the flange 10 and also against its periphery.

Means for holding all in assembly in the line is provided. In the form illustrated in Fig. 2, this may be in a clamping ring 19, of L-shape section to fit against the back face of the auxiliary ring 18 and also about its periphery. And screw-threaded means, as for instance studs 20 and nuts 21 serve to draw this clamping ring to a flange 22, as of conventional type. In the next pipe section a packing ring 24 fits in a groove 25 in the face of flange 2. And the adjacent edges of the auxiliary-flange ring 18 and the clamping ring 19 are recessed sufficiently to provide between them an opposed groove 26 for the packing ring. With such a construction, leakage cannot occur between the flange of the next pipe section and the present flange assembly, nor can it occur between the elements of the flange assembly.

In initial setup of a pipe-line with the present construction, the clamping ring 19 and the auxiliary-flange ring 18 are slid back on the pipe section 3, which may be, for instance, a valve, spool, or any pipe section that is desired to place in the line. The radial-section ring 12 is then assembled on the face of the flange 10 and just permits assembly against the face of the flange 22 of the next section. The packing ring 16 is seated in groove 15, and the auxiliary-flange ring is then slid up into position against the back of the flange 11 with the packing ring between. The packing ring 24 is slid into the groove 25 and half groove 26, the clamping ring 19 is moved forward into position against the auxiliary-flange ring 18, and the screw-threaded fastenings are applied to draw the flange assembly and line flange together.

To dis-assemble, or make any change in the set-up of the line, the nuts 21 are removed, and the clamping ring 19 is slid back on the pipe section 3, then the auxiliary-flange ring 18 is slid back, and the packing ring 24. Then, with such exposure of the periphery of the flange 10 and the sectional ring 12, an implement can be inserted under the ledge 13 and the radial sections be pried out. This gives clearance such that the section with its flange elements can be lifted out of the line.

Manifestly, thus, changes can be made in a line even though it be of large size and rigidly anchored. It will be seen that with the retraction of the clamping ring assembly and the packing ring 24 and the removal of the spacer ring 12, a clearance is provided between the end faces of the flanges 11 and 22 of the pipe sections 3 and 2, respectively, so that section 3 may be shifted axially to the left in Figs. 1 and 2. With the standard flange 6 at the other end of the section 3 released from the associated flange 7 of the next succeeding section, likewise of standard form, this axial movement affords the same clearance at the other end joint, thereby facilitating removal of the packing ring included in the same. Accordingly, a section may be equipped with my improved flange unit at only one end and yet be removable without difficulty.

Other modes of applying the principle of the invention may be employed, change being made as regards the details described, provided the features stated in any of the following claims or the equivalent of such be employed.

I therefore particularly point out and distinctly claim as my invention:

1. In apparatus of the type described, a first conduit having an outwardly directed flange rigid therewith at one end of the same, a second conduit arranged with an end thereof closely adjacent such flanged end of said first conduit and with its centerline in substantially the same plane as that of the first conduit, such end of the second conduit having a rigid outwardly directed flange of less radial extent than the end flange of the first conduit so that the latter projects outwardly beyond the former, the end flange of said first conduit being provided with an annular groove in its end face which is spaced outwardly of the periphery of the end flange of the second conduit, a spacer ring comprising a plurality of independently radially withdrawable segments disposed between and engaged respectively at its ends by the end faces of the two conduit flanges, an inner clamping ring having axial and radial portions mounted on said second conduit with its radial portion overlying the rear face of the flange of this conduit and its axial portion engaged about the flange periphery, an outer clamping ring likewise mounted on said second conduit and comprising axial and radial portions, the radial portion of said outer clamping ring overlying the rear face of the corresponding portion of said inner clamping ring and the axial portion of the outer ring projecting forwardly about the periphery of the inner ring, the end faces of the axial portions of said inner and outer rings being formed to define an annular groove in opposition to the groove provided in the end flange of the first conduit, a packing ring of greater axial extent than said spacer ring having its ends respectively received within the two such grooves, and releasable securing means interconnecting and drawing together the end flange of said first conduit and said outer clamping ring, both said clamping rings and said packing ring being movable axially without deformation of the same on said second conduit for retraction from the end thereof in disassembly of the conduits.

2. In apparatus of the type described, a first conduit having an outwardly directed flange rigid therewith at one end of the same, a second conduit arranged with an end thereof closely adjacent such flanged end of said first conduit and with its centerline in substantially the same plane as that of the first conduit, such end of the second conduit having a rigid outwardly directed flange of less radial extent than the end flange of the first conduit so that the latter projects outwardly beyond the former, the end flange of said first conduit being provided with an annular groove in its end face which is spaced outwardly of the periphery of the end flange of the second conduit, laterally withdrawable spacer means disposed between and engaged respectively at its ends by the end faces of the two conduit flanges, an inner clamping ring having axial and radial portions mounted on said second conduit with its radial portion overlying the rear face of the flange of this conduit and its axial portion engaged about the flange periphery, an outer clamping ring likewise mounted on said second conduit and comprising axial and radial portions, the radial portion of said outer clamping ring overlying the rear face of the corresponding portion of said inner clamping ring and the axial portion of the outer ring projecting forwardly about the periphery of the inner ring, the end faces of the axial portions of said inner and outer rings being formed to define an annular groove in opposition to the groove provided in the end flange of the first conduit, a packing means of greater axial extent than said spacer ring having its ends respectively received within the two such grooves, and releasable securing means interconnecting and drawing together the end flange of said first conduit and said outer clamping ring, both said clamping rings and said packing ring being movable axially without deformation of the same on said second conduit for retraction from the end thereof in disassembly of the conduits.

3. In apparatus of the type described, a first conduit having an outwardly directed flange rigid therewith at one end of the same, a second conduit arranged with an end thereof closely adjacent such flanged end of said first conduit and with its centerline in substantially the same plane as that of the first conduit, such end of the second conduit having a rigid outwardly directed flange of less radial extent than the end flange of the first conduit so that the latter projects outwardly beyond the former, the end flange of said first conduit being provided with an annular groove in its end face which is spaced outwardly of the periphery of the end flange of the second conduit, an inner clamping ring having axial and radial portions mounted on said second conduit with its radial portion overlying the rear face of the flange of this conduit and its axial portion engaged about the flange periphery, an outer clamping ring likewise mounted on said second conduit and comprising axial and radial portions, the radial portion of said outer clamping ring overlying the rear face of the corresponding portion of said inner clamping ring and the axial portion of the outer ring projecting forwardly about the periphery of the inner ring, said inner and outer rings being movable axially on said second conduit and forming a supplemental flange assembly therefor, releasable securing means interconnecting and drawing together such movable flange assembly and the flange of said first conduit, and a packing ring having one end thereof seated in the groove of the first conduit end flange and its other end engaged by such movable flange assembly of the second conduit, said packing ring being movable axially without deformation thereof on said second conduit upon release of the supplemental flange assembly.

4. In apparatus of the character described, a first conduit having an outwardly directed flange rigid therewith at one end of the same, a second conduit arranged with an end thereof in close spaced relation to such flanged end of said first conduit and with its centerline in substantially the same plane as that of the first conduit, such end of the second conduit having a rigid outwardly directed flange of less radial extent than the end flange of the first conduit so that the latter projects outwardly beyond the former, the end flange of said first conduit being provided with an annular groove in that portion of its end face which when projected lies outside the periphery of the end flange of said second conduit, an annular packing ring seated in said groove, a supplemental flange assembly mounted on said second conduit and being axially movable thereon, said supplemental flange assembly comprising a radial portion which overlies the rear face of the end flange of the second conduit and an axial portion which projects forwardly about the periphery of this rigid flange, the end face of such an axial portion being shaped to receive said annular packing ring in fluid tight sealing relation and opposed to the annular groove of the first conduit flange, fastening means releasably interconnecting and drawing together the flange of the first conduit and said supplemental flange assembly, said annular ring thus being of larger diameter than the second conduit flange and disposed entirely outwardly of the same, whereby upon withdrawal of the supplemental flange assembly the ring is movable axially over the second conduit flange without deformation thereof.

5. In apparatus of the character described, a first conduit having an outwardly directed flange rigid therewith at one end of the same, a second conduit arranged with an end thereof in close spaced relation to such flanged end of said first conduit and with its centerline in substantially the same plane as the first conduit, such end of the second conduit having a rigid outwardly directed flange of less radial extent than the end flange of the first conduit so that the latter projects outwardly beyond the former, a supplemental flange assembly mounted on said second conduit and being axially movable thereon, said supplemental flange assembly comprising a radial portion which overlies the rear face of the end flange of the second conduit and an axial portion which projects forwardly about the periphery of this rigid flange, fastening means releasably interconnecting and drawing together the flange of said first conduit and said supplemental flange assembly, a first packing ring of larger diameter than the second conduit flange disposed and held between the end faces of the flange of the first conduit and the supplemental flange assembly, means to cause said ring to form a fluid tight seal between said flange and said supplemental flange assembly, said first ring being movable axially without deformation past said second flange and along the second conduit upon withdrawal of said supplemental flange assembly, and a second packing ring between the rear face of such second conduit flange and the radial portion of the supplemental flange assembly, and means to cause said second ring to form a fluid tight seal between said second flange and said flange assembly portion.

References Cited in the file of this patent

UNITED STATES PATENTS

| | | |
|---|---|---|
| 1,443,051 | Steindorf | Jan. 23, 1923 |
| 1,855,494 | Sorensen | Apr. 26, 1932 |
| 2,413,308 | Arnold | Dec. 31, 1946 |
| 2,717,793 | Nenzell | Sept. 13, 1955 |

FOREIGN PATENTS

| | | |
|---|---|---|
| 577,979 | Germany | June 8, 1933 |
| 584,896 | Great Britain | Jan. 24, 1947 |